(12) United States Patent
Soni et al.

(10) Patent No.: US 10,891,064 B2
(45) Date of Patent: Jan. 12, 2021

(54) OPTIMIZING CONNECTIVITY IN A STORAGE SYSTEM DATA

(71) Applicant: INTERNATIONAL BUSINESS MACHINES CORPORATION, Armonk, NY (US)

(72) Inventors: Bharti Soni, Jaipur (IN); Shrirang S. Bhagwat, Pune (IN); Komal S. Shah, Pune (IN); Shweta Kulkarni, Nasik (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 15/919,379

(22) Filed: Mar. 13, 2018

(65) Prior Publication Data

US 2019/0286353 A1 Sep. 19, 2019

(51) Int. Cl.
*G06F 3/06* (2006.01)
*G06F 9/455* (2018.01)
*H04L 29/08* (2006.01)

(52) U.S. Cl.
CPC .......... *G06F 3/0635* (2013.01); *G06F 3/0607* (2013.01); *G06F 3/0617* (2013.01); *G06F 9/45558* (2013.01); *H04L 67/1097* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,799,608 B1* | 8/2014 | Raizen | ................... | G06F 3/0689 711/168 |
| 8,918,537 B1* | 12/2014 | Sandstrom | .......... | H04L 12/6418 709/238 |
| 8,984,220 B1* | 3/2015 | Gill | ..................... | H04L 41/0866 711/114 |
| 9,058,119 B1* | 6/2015 | Ray | ........................ | G06F 3/061 |
| 2005/0050271 A1* | 3/2005 | Honda | .................... | G06F 3/067 711/114 |
| 2007/0283042 A1* | 12/2007 | West | ....................... | H04L 65/80 709/238 |
| 2008/0162839 A1* | 7/2008 | Nakamichi | ............. | H04L 67/14 711/159 |
| 2011/0019540 A1* | 1/2011 | Isozu | ...................... | H04L 45/26 370/227 |
| 2012/0233494 A1* | 9/2012 | Sandstrom | ............ | G06F 11/079 714/4.1 |
| 2015/0293708 A1 | 10/2015 | Lang et al. | | |
| 2016/0217049 A1 | 7/2016 | Bali et al. | | |

(Continued)

*Primary Examiner* — Philip J Chea
*Assistant Examiner* — Hassan A Khan
(74) *Attorney, Agent, or Firm* — Griffiths & Seaton PLLC

(57) ABSTRACT

Embodiments for optimizing connectivity in a storage system by a processor. A preferred connectivity path may be determined between a host and a storage controller via one or more selected nodes, one or more storage virtualization systems, or combination thereof. A current connectivity path between the host and the storage controller may be determined to fail to match the preferred connectivity path. The host may be triggered to reconnect to the storage controller via the preferred connectivity path to enhance connectivity to between the host and the storage controller.

12 Claims, 12 Drawing Sheets

(56) References Cited

U.S. PATENT DOCUMENTS

2016/0359955 A1    12/2016  Gill et al.
2019/0102093 A1*   4/2019   Parnell ................ G06F 11/3409
2019/0155532 A1*   5/2019   Takakura .............. G06F 3/0635

* cited by examiner

OPTIMIZING CONNECTIVITY IN A STORAGE SYSTEM DATA

BACKGROUND OF THE INVENTION

Field of the Invention

The present invention relates in general to computing systems, and more particularly to, various embodiments for optimizing connectivity in a storage system using a computing processor.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future.

SUMMARY OF THE INVENTION

Various embodiments for optimizing connectivity in a storage system by a processor are provided. A preferred connectivity path may be determined between a host and a storage controller via one or more selected nodes, one or more storage virtualization systems, or combination thereof. A current connectivity path between the host and the storage controller may be determined to fail to match the preferred connectivity path. The host may be triggered to reconnect to the storage controller via the preferred connectivity path to enhance connectivity to between the host and the storage controller.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
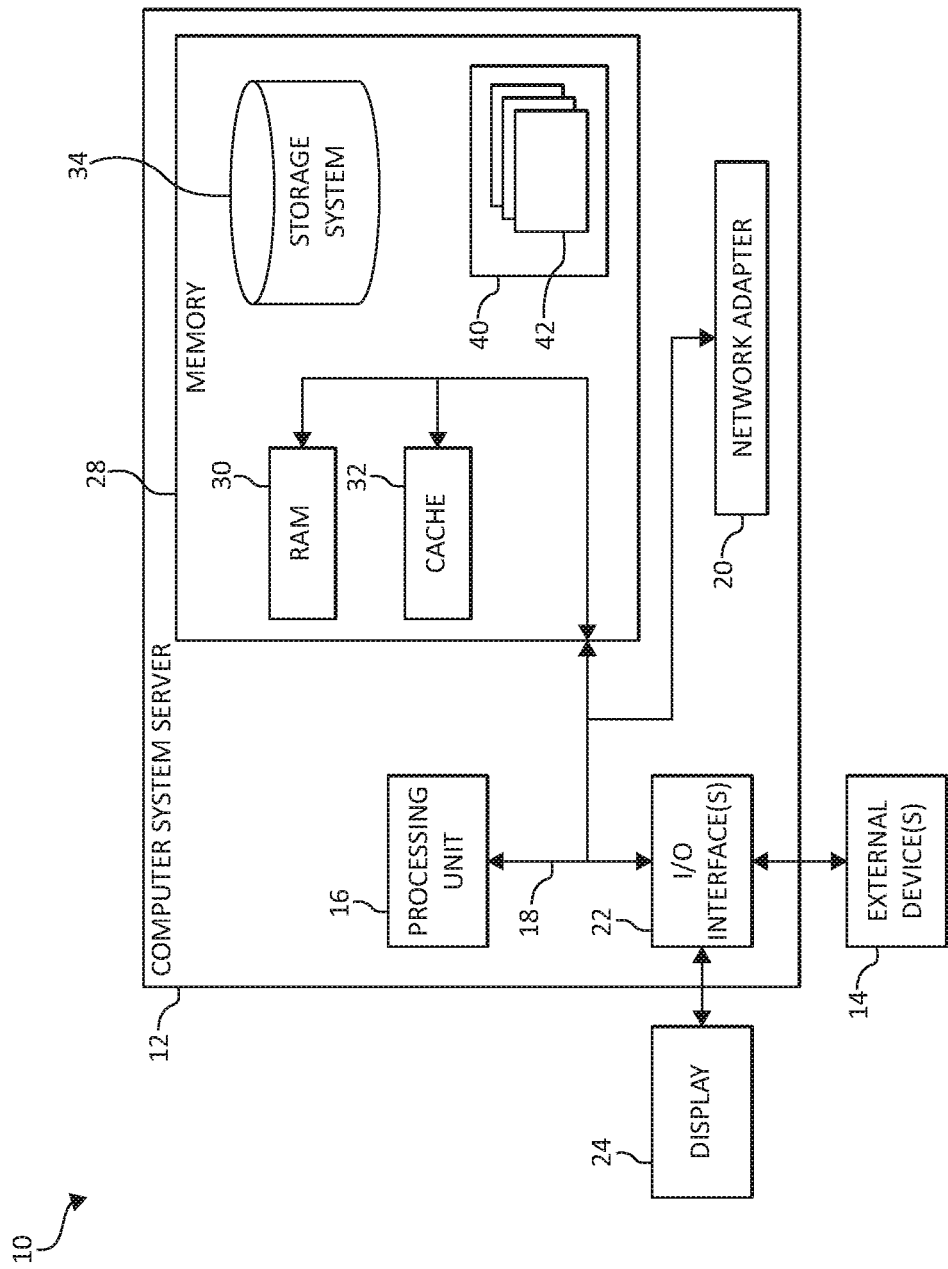
FIG. 1 is a block diagram depicting an exemplary cloud computing node according to an embodiment of the present invention.

The storage of data in large entities is of fundamental importance, both for reliability of the data and for the ability to recover data in the event of any hardware failure. Storage area network (SAN) is an architecture that is used when very large amounts of data are needed to be stored in a reliable and secure manner. This technology allows networks to be created that support the attachment of remote computer storage devices such as disk arrays to servers in such a way that, to the operating system, the devices appear as locally attached. It is common in these networks to include a large amount of redundancy, both in the data storage and in the hardware connections between the individual components.

A SAN may also be, and/or include, a storage subsystem that may be described as including one or more host computers and one or more storage servers. The storage servers provide the host computers access to storage, such as a disk. A disk may be partitioned into tracks, which are partitioned into sectors. A data storage controller consists of an array of disks managed by one or more applications, which enables a faster and more reliable data retrieval. That is, a storage controller may be part of a storage subsystem and may include a storage virtualization engine that takes sectors from a plurality of physical disks and makes them available to one or more host processors at host computers as sectors of a plurality of "virtual" disks, which is analogous to logical memory for multiprocessing host computers. The storage virtualization engine maintains and manages the mapping of sectors from physical to logical disks. Input/Output (I/O) commands are made to logical disk sectors and sent to the storage virtualization engine. The storage virtualization engine may redirect the I/O commands to the appropriate sector on a physical disk. In some implementations, a hardware cache, managed by the storage virtualization engine, is a front end for the physical disks, and I/O commands may be serviced from the cache.

There are two ways in which the storage can be accessed, block level access and file level access. Storage Virtualization is an abstraction of logical storage (entity which is exposed to the host) from the physical storage. That is, storage virtualization refers to the process of separating (through abstraction) logical storage from physical storage. The term is used to describe this separation at any layer in the storage software and hardware stack. Virtualization of storage, for example, helps achieve location independence by abstracting the physical location of the data. The virtualization system presents to the user a logical space for data storage and itself handles the process of mapping it to the actual physical location.

Although storage virtualization increases efficiency in data storage management, along with additional advantages, performance may be compromised due to undesirable or negative system configurations. Detecting a suboptimal or "undesirable" system configuration is nearly impossible with large configurations having multiple computing elements.

Accordingly, the present invention provides a solution for optimizing connectivity in a storage system by a processor. A preferred connectivity path may be determined between a host and a storage controller via one or more selected nodes, one or more storage virtualization systems, or combination thereof. A current connectivity path between the host and the storage controller may be determined to fail to match the preferred connectivity path. The host may be triggered to reconnect to the storage controller via h preferred connectivity path to enhance: connectivity between thy: host and the storage controller.

In one aspect, an optimal path (e.g., optimal connectivity) between a host and a storage controller and/or storage virtualization system may be determined. That is, upon receipt of an I/O request, a determination operation may determine a current connectivity between the host and the storage controller and/or determine the storage virtualization system is inefficient and non-optimal. Upon determining the connectivity is inefficient and non-optimal, a signal may be communicated to the host (e.g., an initiator of an I/O process). The signal triggers the host to optimize the connection between the host and the storage controller and/or storage virtualization system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
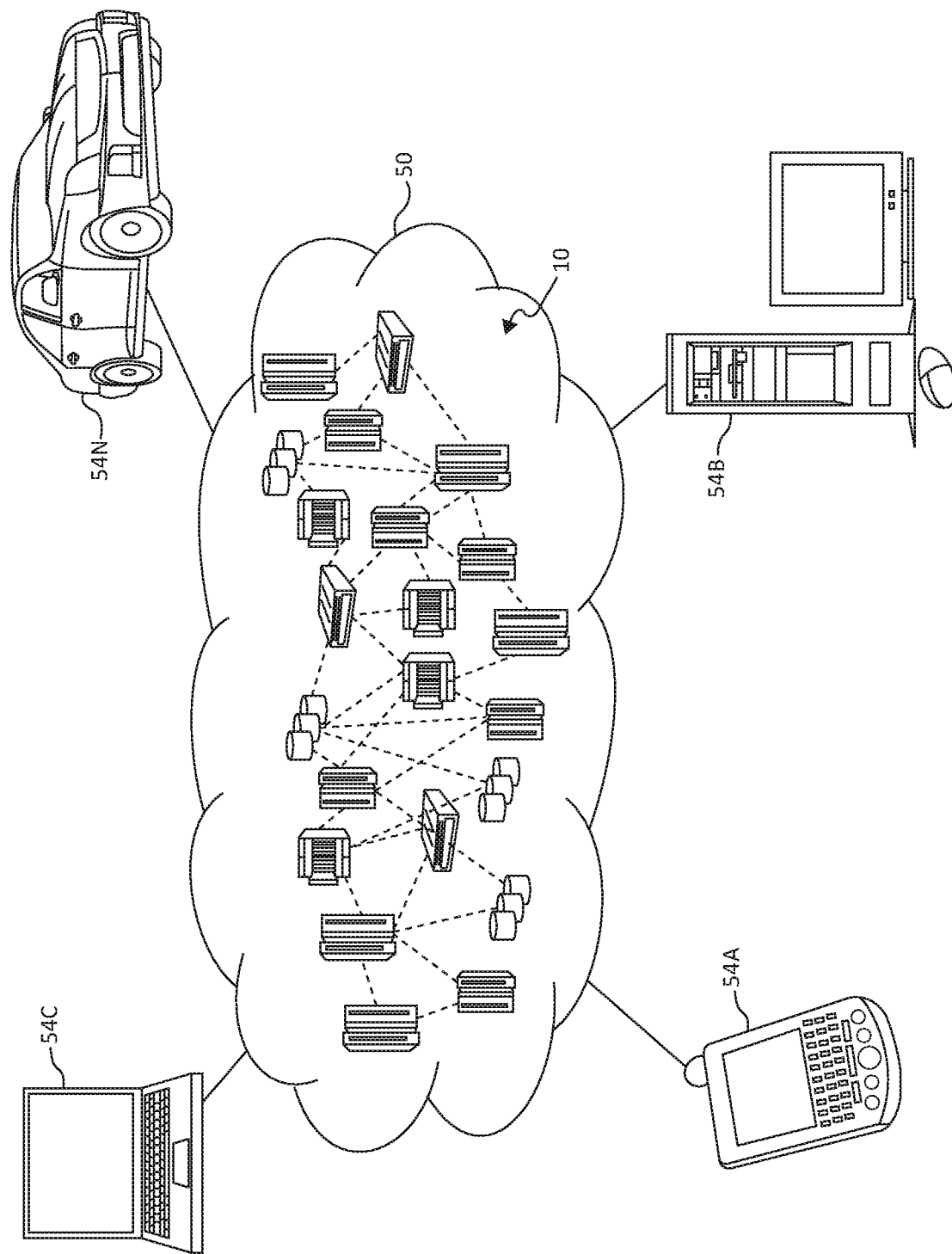
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
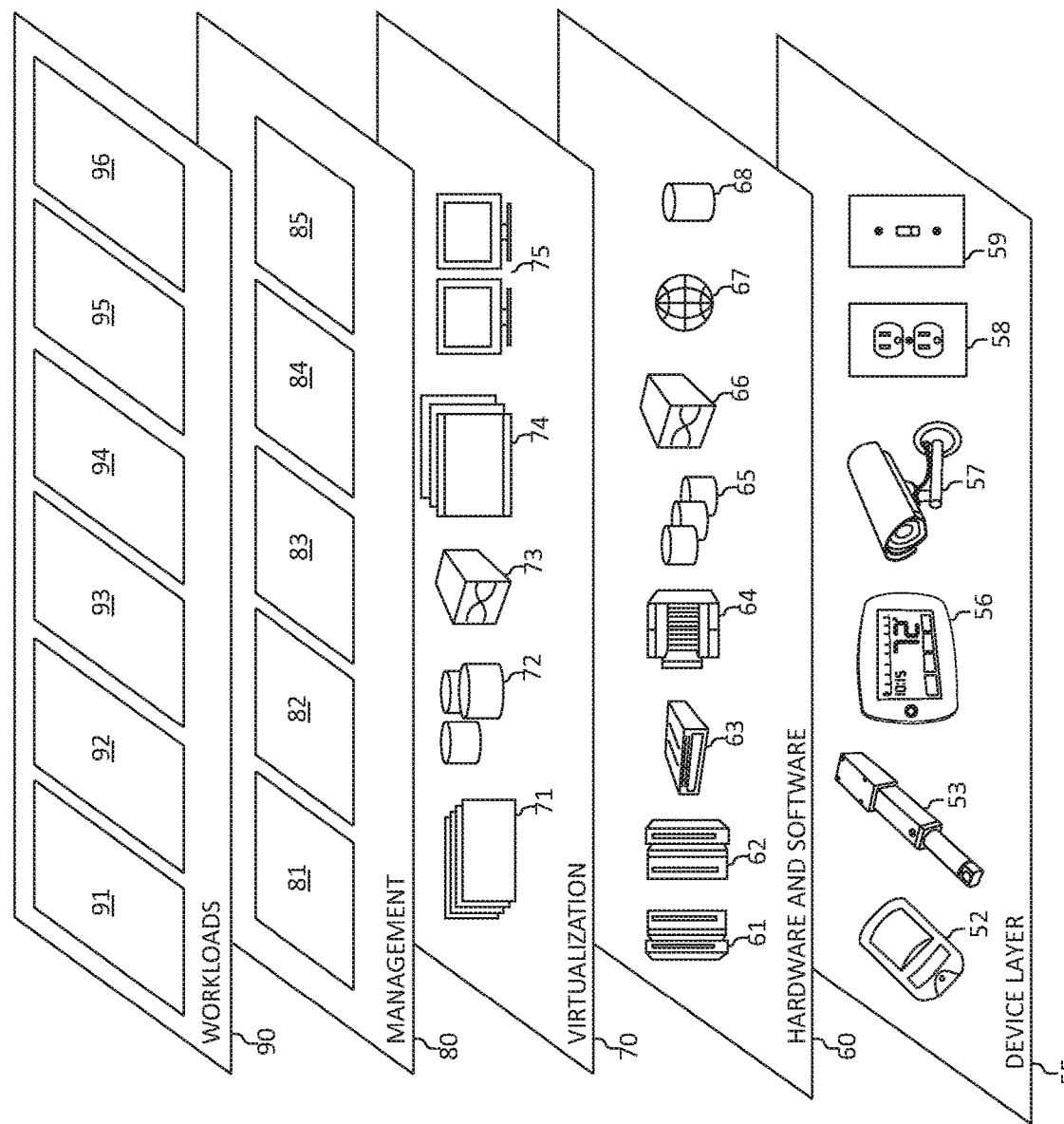
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for optimizing connectivity in a storage system. In addition, workloads and functions 96 for optimizing connectivity in a storage system may include such operations as data analysis (including data collection and processing from organizational databases, online information, knowledge domains, data sources, and/or social networks/media, and other data storage systems, and predictive and data analytics functions. One of ordinary skill in the art will appreciate that the workloads and functions 96 for optimizing connectivity in a storage system may also work in conjunction with other portions of the various abstractions layers, such as those in hardware and software 60, virtualization 70, management 80, and other workloads 90 (such as data analytics and/or fungibility processing 94, for example) to accomplish the various purposes of the illustrated embodiments of the present invention.

As previously stated, although storage virtualization increases efficiency in data storage management, along with additional advantages, performance may be compromised due to undesirable or negative system configurations. Detecting a suboptimal or "undesirable" system configuration is nearly impossible with large configurations having multiple computing elements. Thus, the mechanisms of the illustrated embodiments provide a solution for optimizing connectivity between a host and a storage controller and/or a storage virtualization system. To further illustrate the operations of the present invention, consider the following example of host-to-storage controller connectivity.

Figure 4A:
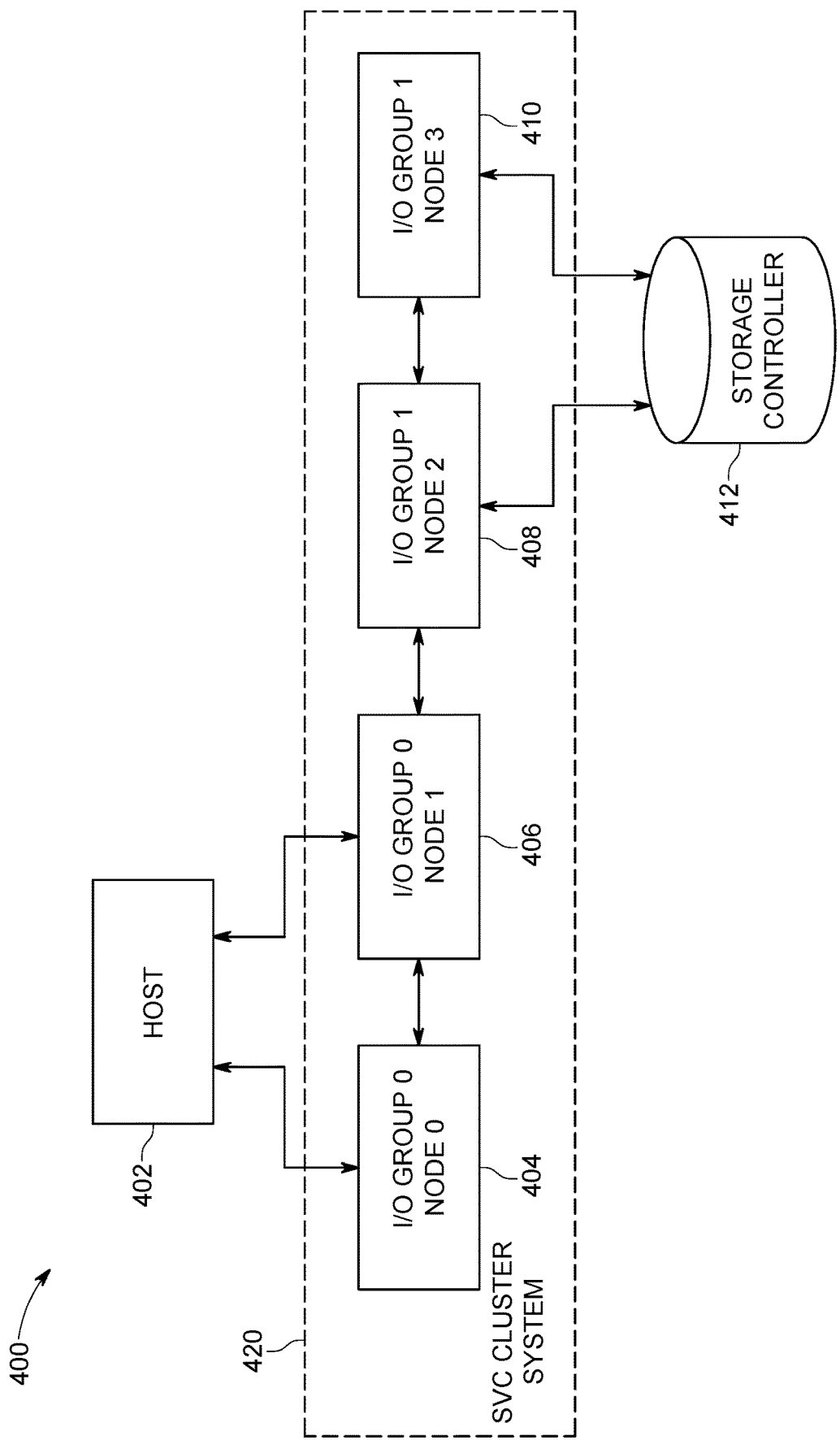
FIG. 4A is an additional block diagram depicting host-to-storage controller connectivity via a storage volume controller ("SVC") system according to an embodiment of the present invention.
Figure 4B:
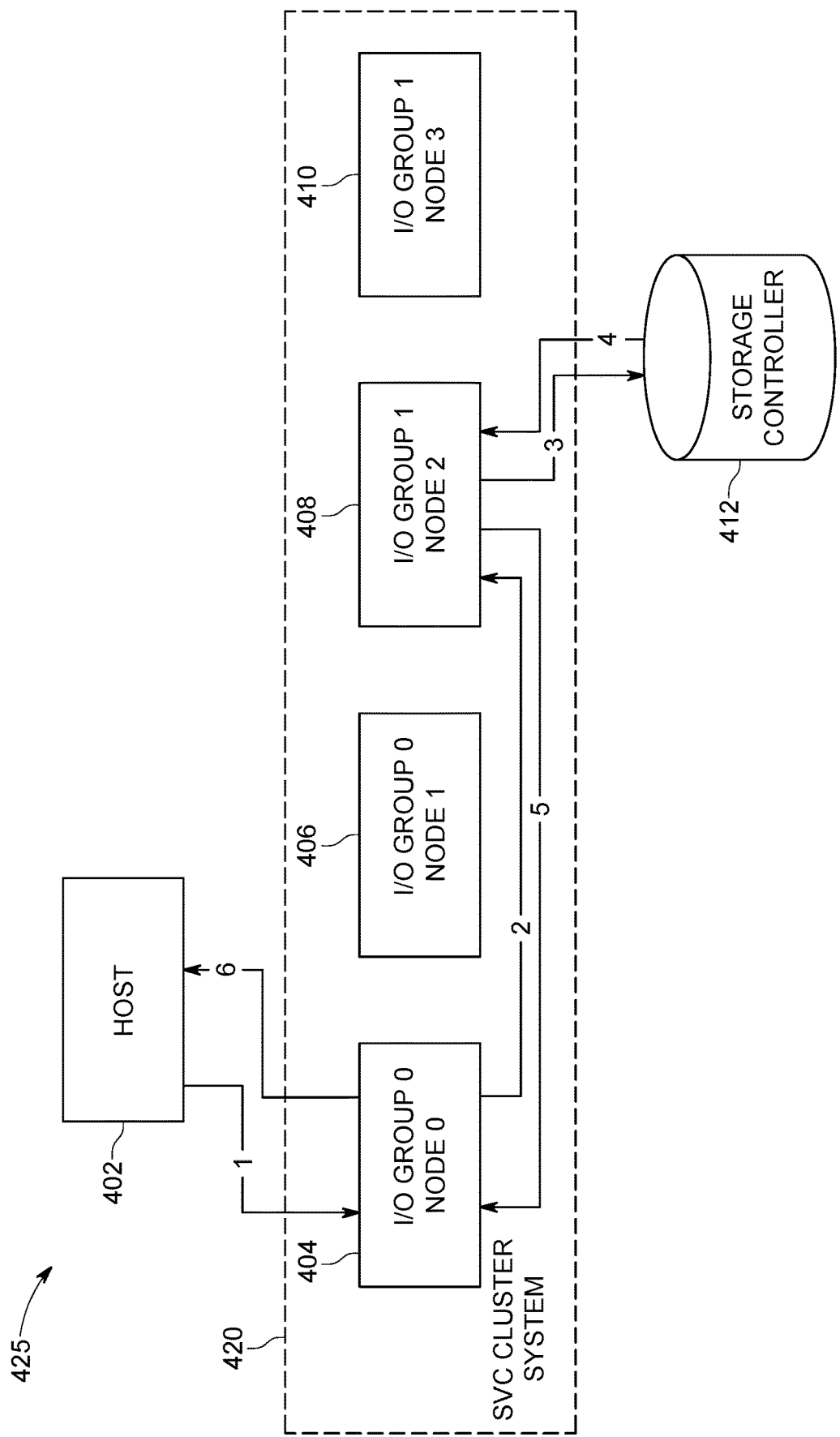
FIG. 4B is an additional block diagram depicting Input/Output ("I/O") request and response flow in a host-to-storage controller connectivity via a storage volume controller ("SVC") system according to an embodiment of the present invention.
Figure 4C:
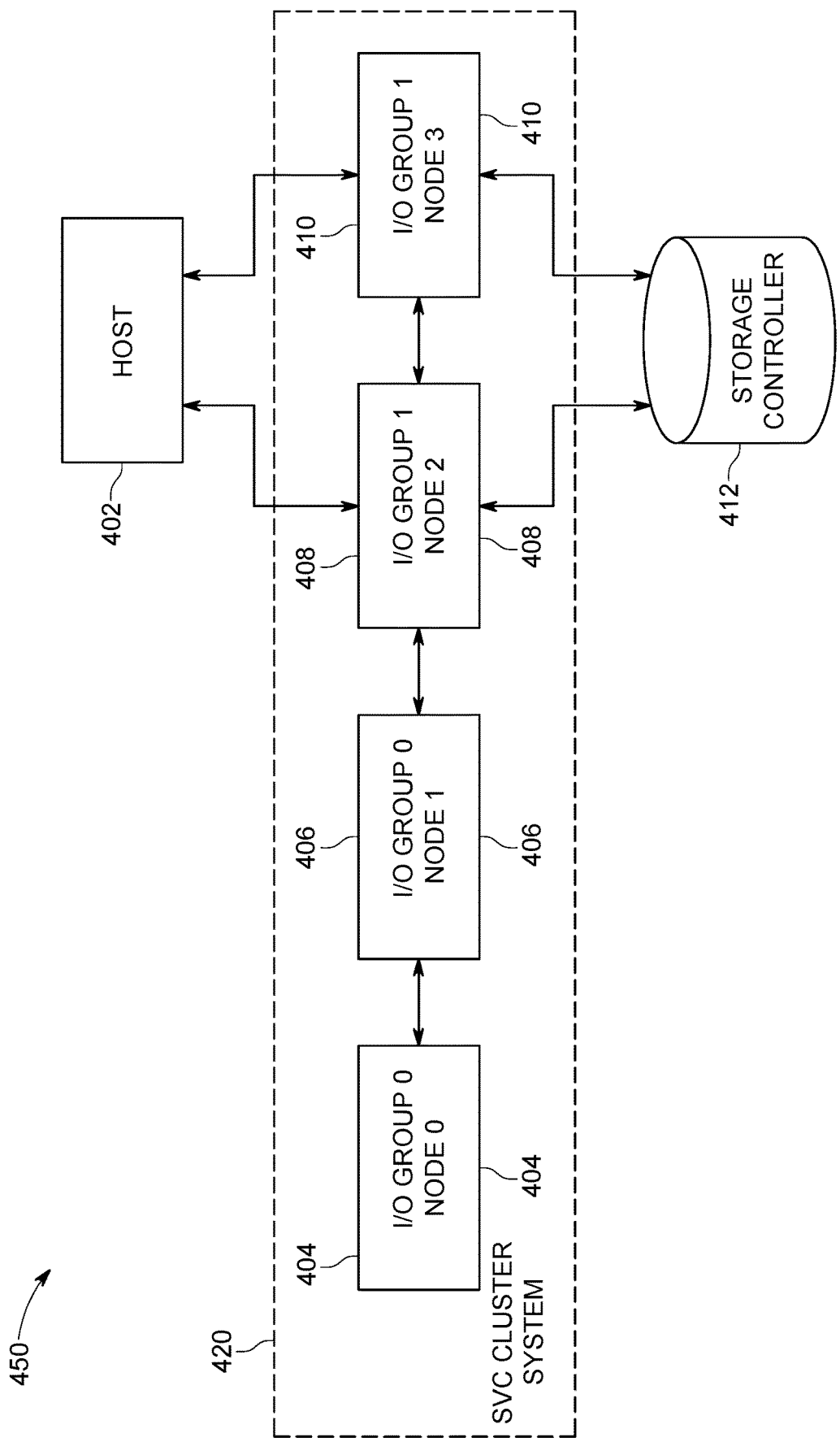
FIG. 4C is an additional block diagram depicting optimal connectivity for host accessing a storage controller via a storage volume controller ("SVC") clustered system according to an embodiment of the present invention.
Figure 4D:
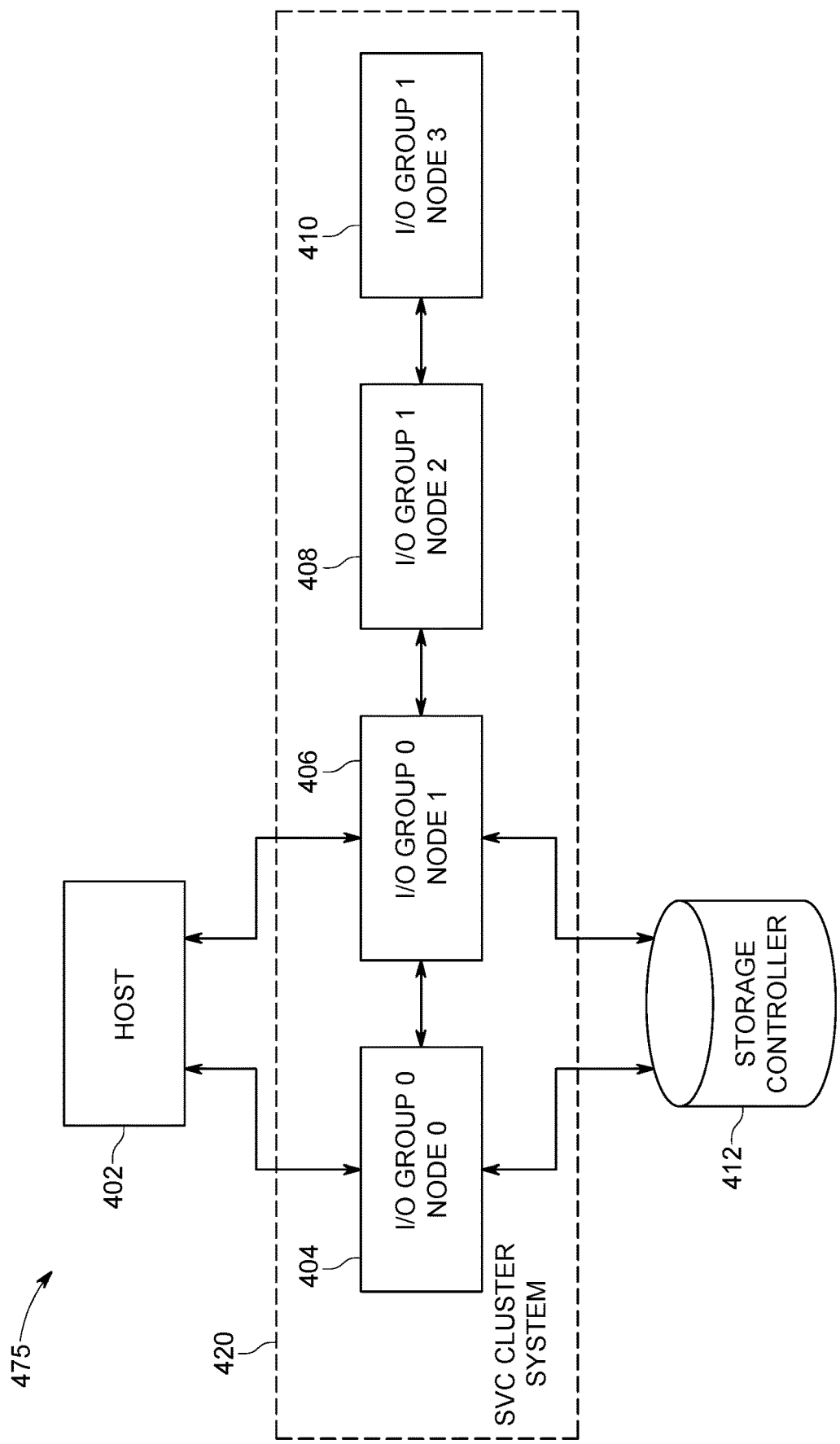
FIG. 4D is an additional block diagram depicting optimal connectivity for host accessing a storage controller via a storage volume controller ("SVC") clustered system according to an embodiment of the present invention.

Turning now to FIGS. 4A-4D, diagrams 400, 425, 450, and 475 depict a host-to-storage controller connectivity via a storage volume controller ("SVC") system. More specifically, FIG. 4A depicts a sample host-to-storage controller connectivity (e.g., sub-optimal connectivity) via a storage volume controller ("SVC") system, FIG. 4B depicts the Input/Output ("I/O") request and response flow in the host-to-storage controller connectivity (e.g., sub-optimal connectivity) via a storage volume controller ("SVC") system, FIG. 4C depicts optimal connectivity for host accessing a storage controller via a storage volume controller ("SVC") clustered system, and FIG. 4D depicts optimal connectivity for host accessing a storage controller via a storage volume controller ("SVC") clustered system. In one aspect, one or more of the components, modules, services, applications, and/or functions described in FIGS. 1-3 may be used in FIGS. 4A-4D. For example, computer system/server 12 of FIG. 1, incorporating processing unit 16, may be used to perform various computational, data processing and other functionality in accordance with various aspects of the present invention.

In one aspect, FIGS. 4A-4D illustrate a host 402, a SAN Volume Controller ("SVC") cluster system 420, and a storage controller 412. The SVC cluster system 420 may include node 0 (e.g., node 404), node 1 (e.g., node 406), node 2 (e.g., node 408), and node 3 (e.g., node 410). In one aspect, the nodes may be associated with an I/O group (e.g., I/O group 0 and/or I/O group 1). In one aspect, an I/O group may be a pair of nodes within a single enclosure (e.g., SVC cluster system 420).

In one aspect, a SAN virtualizer (e.g., an SVC) such as, for example, an IBM® SAN SVC, is a storage virtualization mechanism that provides block access to storage via the Internet Small Computer System Interface ("iSCSI"), Fibre Channel ("FC"), and Fibre Channel over Ethernet ("FCoE") interconnect. (IBM is a registered trademark of International Business Machines Corporation, Armonk, N.Y.). SVC can also be used to virtualize iSCSI SAN storage and an SVC may recommend I/O group wide connectivity for some of the iSCSI SAN storage controllers. I/O group wide connectivity means that only the nodes in a specific I/O group will be connected to the backend storage controller and not all the nodes. FIG. 4A depicts this connectivity, where an SVC storage virtualization clustered system consists of 2 I/O groups (with 2 nodes each) but only a single I/O group (node2 and node3) is connected to back-end storage. That is, the host 402 is connected to the storage controller 412 via node 0 (e.g., node 404) and node 1 (e.g., node 406).

Now consider the scenario in FIG. 4B, where the host 402 needs to access the back-end storage controller 412. The host 402 has established iSCSI sessions with node 0 and node 1 (e.g., node 404 and node 406) from I/O group 0. All the data requests from the host 402 to the storage controller 412 will go through the SVC clustered system 420. The I/O request/response flow is illustrated (via numbers 1-6) in FIG. 4B based on the sub-optimal connectivity path.

As the host 402 is connected to I/O group 0, the host 402 will send the I/O request to one of the nodes (node 0 or node 1). Clustered applications may implement cache in order to reduce the I/O latency, but if a cache miss occurs, the data has to be fetched from storage controller 412. In that case the SVC clustered system 420 will send the data request (in SCSI format) to the back-end storage controller 412. Here, as storage controller 412 is connected to node 2 (e.g., node 408) and node 3 (e.g., node 410), the data request from node 0 (e.g., node 404) or node 1 (e.g., node 406) will be first passed to node 2 (e.g., node 408) or node 3 (e.g., node 410), which is connected to the storage controller 412.

As shown in FIG. 4B, all the I/O requests issued on node 0 (e.g., node 404) and node 1 (e.g., node 406) must be passed to node 2 (e.g., node 408) or node 3 (e.g., node 410) for the purpose of data fetching. This suboptimal connectivity adds an additional hop in the I/O path in both directions (e.g., I/O request and I/O response). Any such additional hop during I/O path leads to the inefficient or negative performance.

As such, FIGS. 4C-4D illustrate optimal connectivity for the host 402 accessing the storage controller 412 via the SVC clustered system 420. That is, FIGS. 4C-4D illustrate optimal connectivity so that even if a cache miss happens the data is retrieved as compared to alternative connectivity. For example, in FIG. 4C the storage controller 412 is connected to node 2 (e.g., node 408) or node 3 (e.g., node 410). Thus, the host 402 is optimally connected to node 2 (e.g., node 408) or node 3 (e.g., node 410) so as to increase connectivity efficiency to storage controller 412. The host 402 will send the I/O request to and/or receive the I/O response from one of the nodes (node 2 or node 3).

Alternatively, in FIG. 4D the storage controller 412 is connected to node 0 (e.g., node 404) and node 1 (e.g., node 406). Thus, the host 402 is optically connected to node 0 (e.g., node 404) and node 1 (e.g., node 406) so as to increase connectivity efficiency to storage controller 412. The host 402 will send the I/O request to and/or receive the I/O response from one of the nodes (node 0 or node 1).

Figure 5A:
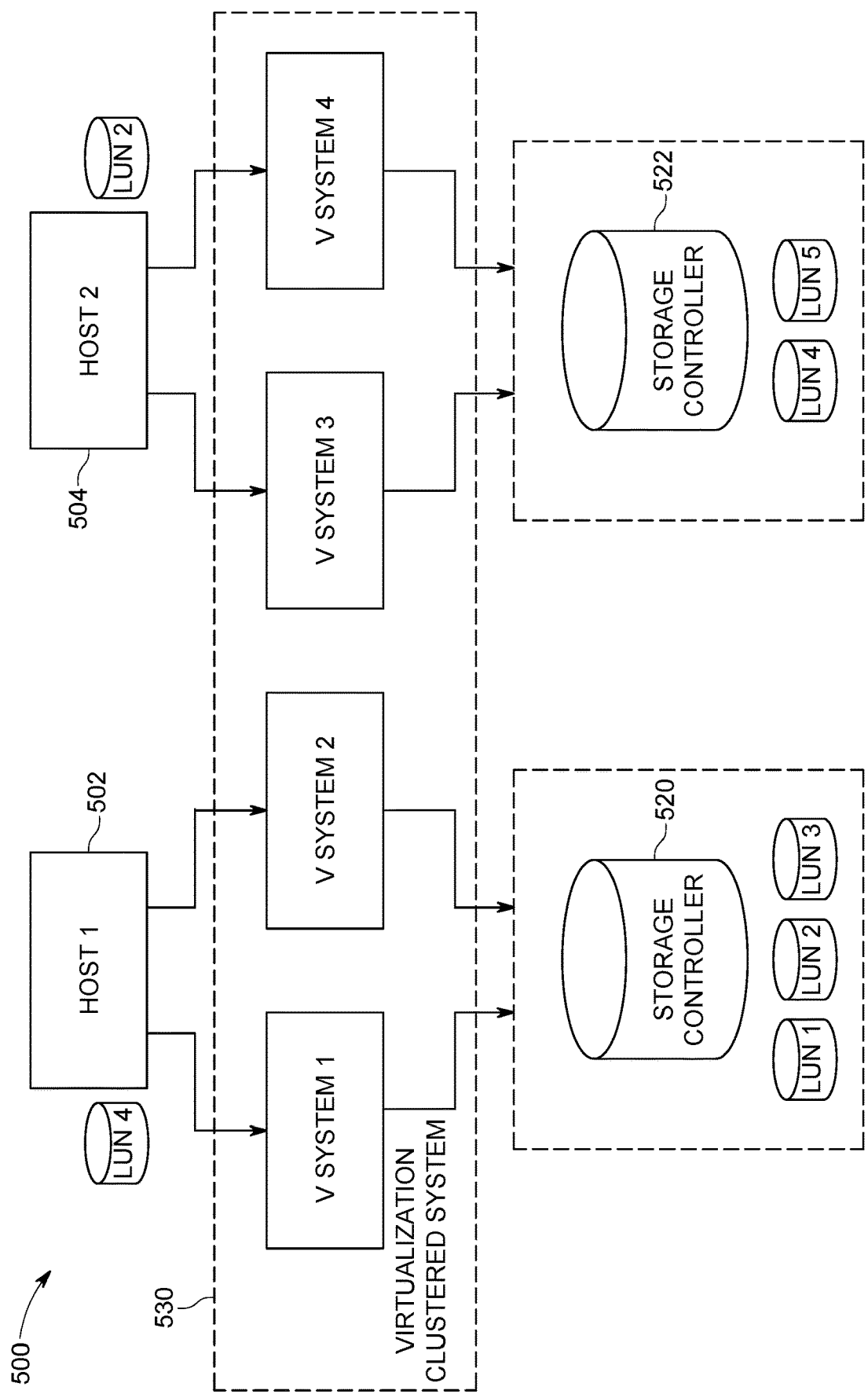
FIG. 5A is an additional block diagram depicting storage area network ("SAN") with multiple hosts, storage controllers, and a virtualization system according to an embodiment of the present invention.
Figure 5B:
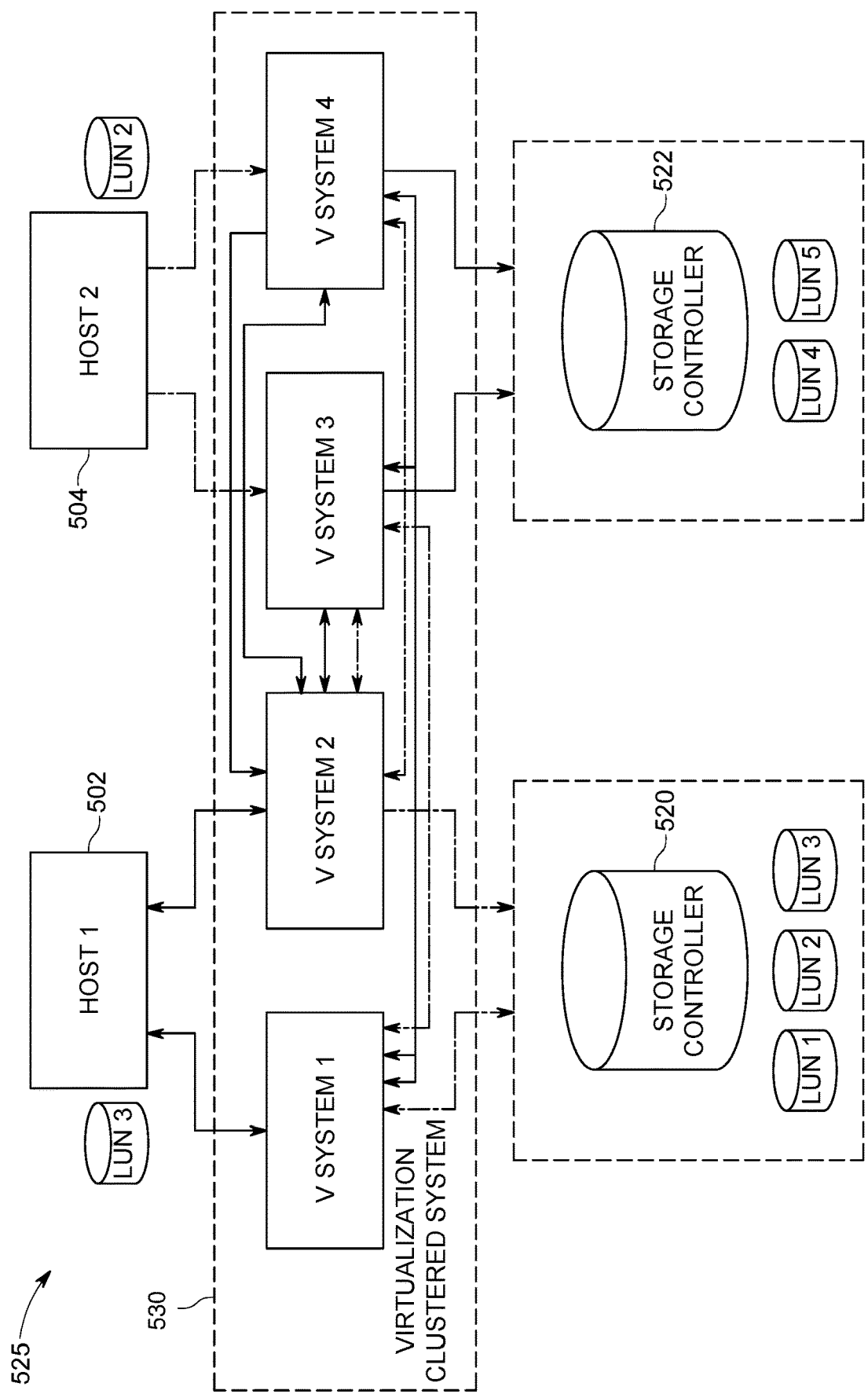
FIG. 5B is an additional block diagram depicting Input/Output ("I/O") flow to storage area network ("SAN") storage controllers according to an embodiment of the present invention.

Turning now to FIGS. 5A-5B, diagrams 500 and 525 depict storage area network ("SAN") with multiple hosts (e.g., 2 hosts, storage controllers (e.g., 2 storage controllers), and a virtualization system). Additionally, FIG. 5B depicts Input/Output ("I/O") flow from a host to a SAN storage controller (e.g., iSSI SAN storage controller). In one aspect, one or more of the components, modules, services, applications, and/or functions described in FIGS. 1-4 (e.g., FIGS. 4A-4D) may be used in FIGS. 5A-5B. For example, computer system/server 12 of FIG. 1, incorporating processing unit 16, may be used to perform various computational, data processing and other functionality in accordance with various aspects of the present invention.

In one aspect, FIGS. 5A-5B illustrate hosts 502 and 504, a storage virtualization clustered system 530 ("virtualization clustered system"), storage controllers 520 and 522, and logical unit number ("LUN") 1, LUN 2, LUN 3, LUN 4, and LUN 5. LUN 1-3 are connected to and/or associated with storage controller 520. LUN 4 and LUN 5 are connected to and/or associated with storage controller 522. The storage virtualization clustered system 530 may include virtualization system 1 ("V System 1"), V System 2, V System 3, and/or V System 4.

In one aspect, host 502 is accessing LUN 4, which is exposed from storage controller 522. Host 504 is accessing LUN 2, exposed from storage controller 520 via the virtualized clustered system 530. Host 502 is connected to V System 1 and V System 2, Host 504 is connected to V System 3 and V System 4. V System 1 and V System 2 are connected to storage controller 520 and V System 3 and V System 4 are connected to storage controller 522.

However, as illustrated in FIG. 5A, the connectivity between the hosts 502, 504 to the storage controllers 520, 522 are not optimal (according to the various I/O requests/responses that may be required). Thus, FIG. 5B represents the data flow of FIG. 5A. In one aspect, the lines (e.g., solid lines) show the I/O path of all the read, write requests, and/or responses issued by host 502 and alternative lines (e.g., dashed lines) show the I/O connectivity path of all the read, write requests, and/or responses issued by host 504. In case of cache miss, all the I/O requests and responses have to proceed through two nodes of the virtualization system. Thus, the present invention provides a solution to convert, dynamically or on-demand, sub-optimal and inefficient connectivity to optimal connectivity for iSCSI interconnect so as to increase computing efficiency for I/O requests and/or I/O responses. Thus, if a sub-optimal connectivity exists (which may be determined via an optimal connectivity operation determination) in a data center, the present invention may configure (dynamically or on-demand) the connectivity between one or more hosts to many storage controllers via one or more virtualization systems. After identifying that the connectivity is not optimal, endpoints of the virtualization clustered system may be reconfigured and/or reconnected to one or more identified internet protocol addresses to optimize connectivity.

Thus, a storage virtualization system such as, for example, the storage virtualization system 500, 525 may identify and/or become aware that the connectivity between hosts (e.g., hosts 502, 504) to storage controller 520 and/or 522 via the virtualization system 530 is sub-optimal connectivity. Once identified, a signal to the host may trigger the configuration conversion into an optimal connectivity. Thus, the optimal connectivity boosts the performance and efficiency in the storage virtualization system 500, 525 even in the event of a cache miss.

The mechanisms of the illustrated embodiments optimize connectivity in a storage system by one or more computing processor devices. In one aspect, the following steps illustrate the operations of the present invention, which may be implemented in FIGS. 4A-4D and/or FIGS. 5A-5B. In step 1, an optimal connectivity path between a host to virtualization system may be determined. In step 2, a determination operation may be performed to determine if the current connectivity is optimal or sub-optimal. In step 3, a signal may be sent to an initiator (e.g., a host) if the current connectivity is sub-optimal. In step 4, the initiator (e.g., a host) may be triggered to make the connectivity optimal (e.g., make optimal connectivity) between the host to the virtualization system.

More specifically, in step 1, the optimal host-to-virtualization system connectivity may be located and/or determined. The storage virtualization system may store Host-to-LUN mapping in a database. The storage virtualization system may also store backend storage system connectivity details. The connectivity details may be used to conclude on what optimal connectivity is best suited for a selected host.

For example, as illustrated in FIG. 5A, storage virtualization system 500 may be aware that host 1 (e.g., host 502) is accessing LUN 4 exposed from storage controller 522 and storage controller 522 is connected with V system 3 and V system 4. Hence, host 502 should have direct connectivity with V system 3 and V system 4. Similarly host 504 should have direct connectivity with V system 1 and V system 2.

In step 2, a determination operation may be performed to determine if the current connectivity is optimal or not optimal (e.g., sub-optimal). A storage virtualization system may also store the host-to-virtualization system connectivity details. Using this information and the knowledge about optimal connectivity (obtained from step 1), the storage virtualization system can determine whether the current connectivity is optimal or non-optimal.

From FIG. 5A, from step 1, it may be determined that host 1 (e.g., host 502) should login into V system 3 and V system 4. However, since host 1 (e.g., host 502) is currently connected to V system 1 and V system 2, it may be determined that this connectivity is not optimal for host 1 (e.g., host 502) (given the need to connect to V system 3 and V system 4). Similarly, connectivity is not optimal for host 2 (e.g., host 504) since host 2 (e.g., host 504) needs to connect to V system 1 and V system 2.

Figure 6:
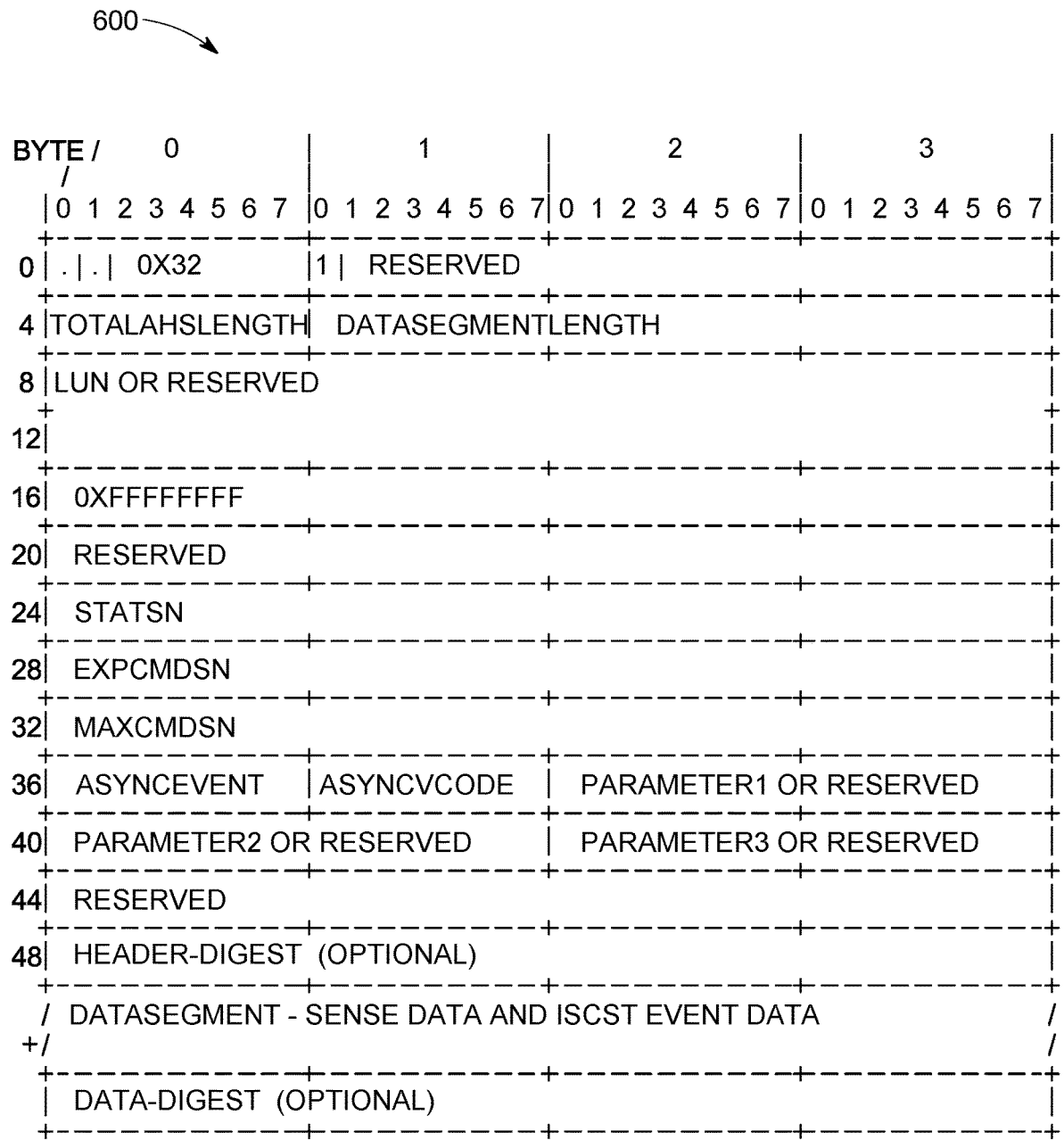
FIG. 6 is a diagram depicting a target asynchronous message in accordance with aspects of the present invention.

In step 3, a signal may be sent to an initiator (e.g., host such as, for example, host 502 and/or 504) if the current connectivity is not optimal (e.g., sub-optimal). After the storage virtualization system has detected that host-to-storage virtualization system connectivity is not optimally connected, a signal may be communicated from the storage virtualization system (e.g., from the storage controller 520 or 522) to the host (e.g., host 502 and/or 504). The iSCSI RFC ("request for comments") may provide an operation in which a target (e.g., a storage virtualization system—which may include a storage controller) can send an asynchronous message (opcode 0x32) to the initiator (e.g., host). PDU format of this asynchronous message such as, for example, as illustrated in FIG. 6, where FIG. 6 is a diagram depicting a target asynchronous message. FIG. 6 is one example of an exemplary protocol data unit ("PDU") format for the asynchronous message. In other aspects, the PDU format may be different or provided according to configuration and/or user preference. An asynchronous message may be used to signal the initiator that the connectivity to the virtualization system is not optimal.

For example, as per RFC 3720 (e.g., iSCSI), an asynchronous event value (e.g., "AsyncEvent" value 255) may signify vendor specific events and AsyncVCode may be used to add vendor specific details. In one aspect, the AsyncVCode is a vender specific code that may be used to add vendor specific details, and in one aspect, by way of example only, a selected value may be used (with the AsyncVCode) to indicate that the asynchronous messages are sent to provide notification of sub-optimal connectivity.

In one aspect, the AsyncEvent value may be 255 and the AsyncVCode may be used in the asynchronous message to indicate sub-optimal connectivity. Along with these fields (e.g., the AsyncEvent value and AsyncVCode fields), a data segment field may be filled with a list of internet protocol addresses ("IPs") for the host to do discovery and login. It should be noted that the optimal connectivity is already known from step 1 in order to quickly determine the IP list.

In step 4, the host may perform one or more operations and/or actions. For example, after receiving the asynchronous message such as, for example, the asynchronous message from FIG. 6, which may have the AsyncEvent as 255 and AsyncVCode that indicates sub-optimal connectivity, a host (e.g., host 502 and/or 504) may first discover all the IPs given in the data segment of the asynchronous message PDU and trigger the login into one or more of the discovered portals. The host (e.g., host 502 and/or 504) may then logout from older IP connections, which are determined as not optimal. The host (e.g., host 502 and/or 504) may logout after the host (e.g., host 502 and/or 504) successfully logs into the new IPs (included in the list of IPs) to avoid disruption in the data connectivity.

Figure 7:
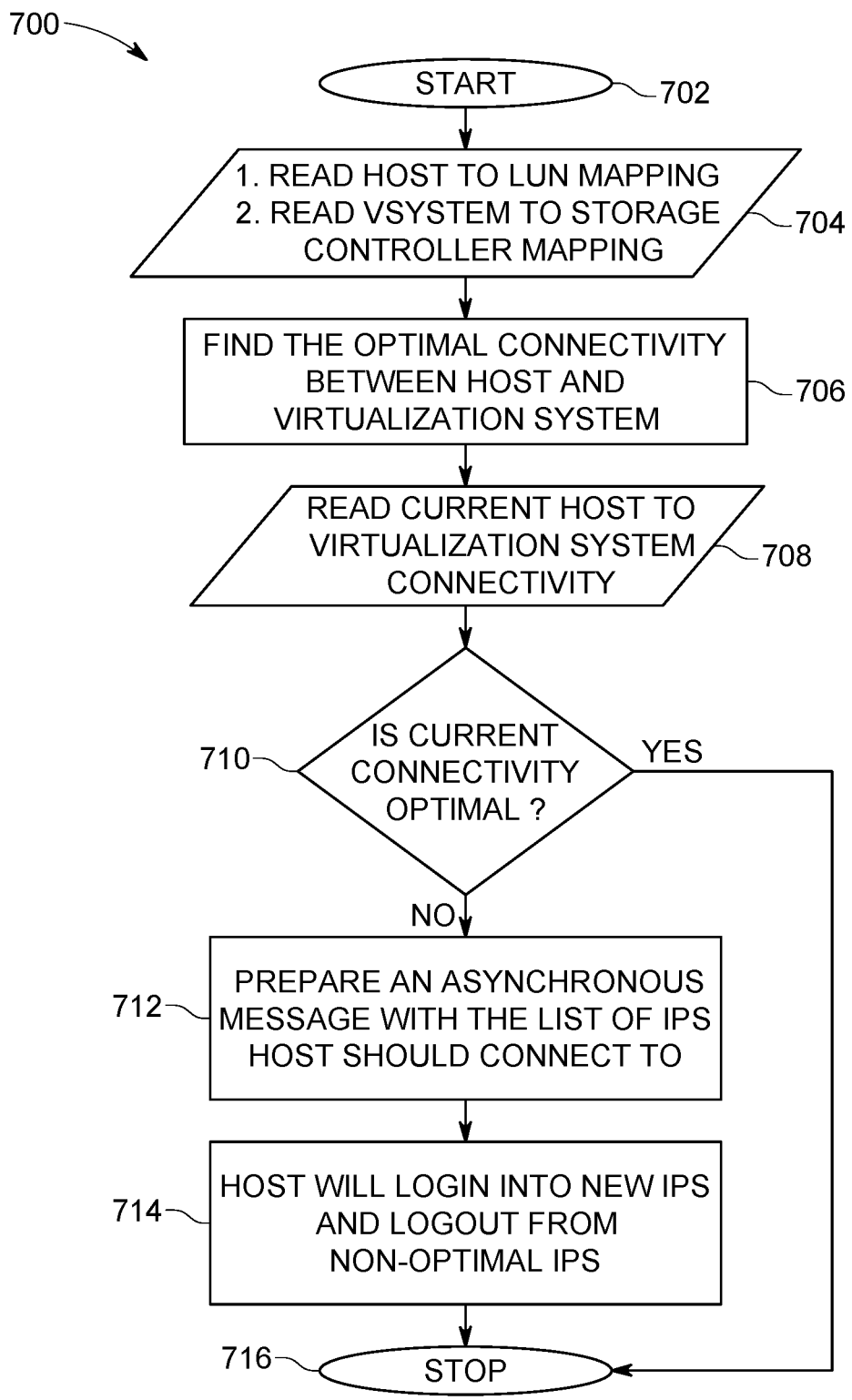
FIG. 7 is a flowchart diagram depicting an exemplary method for optimizing connectivity in a storage system by a processor; again, in which aspects of the present invention may be realized.

Turning now to FIG. 7, a method 700 for optimizing connectivity in a storage system by a processor is depicted, in which various aspects of the illustrated embodiments may be implemented. That is, FIG. 7 is a flowchart of an additional example method 700 for optimizing connectivity in a storage system in a computing environment according to an example of the present invention. The functionality 700 may be implemented as a method executed as instructions on a machine, where the instructions are included on at least one computer readable medium or one non-transitory machine-readable storage medium. The functionality 700 may start in block 702.

A host to LUN mapping may be read and/or a virtualization system ("V system" or storage virtualization system) to storage controller mapping may be read, as in block 704. A preferred connectivity (e.g., an optimal connectivity) between a host and a virtualization system may be located, identified, determined, and/or defined (e.g., found), as in block 706. A current host to virtualization system connectivity may be read (e.g., read the current connectivity path of the host to virtualization system), as in block 708. An operation may be performed to determine if the current connectivity (between the host and the virtualization system) is optimal (e.g., a preferred connectivity path), as in block 710. If yes, the operations of functionality 700 may move to block 716. If no, a notification (e.g., an asynchronous message with a list of IPs) may be communicated or sent to the host indicating those of the IPs associated with the preferred connectivity path the host should login/connect to so as to increase connectivity efficiency (e.g., optimize connectivity between the host and a storage controller and/or storage virtualization system), as in block 712. The host may login/connect to one or more new, optimal IPs (those of the IPs listed in the list of IPs associated with the preferred connectivity path) and logout of the non-optimal IPs (those of the IPs not listed in the list of IPs and/or not associated with the preferred connectivity path), as in block 714. The functionality 700 may end in block 716.

Figure 8:
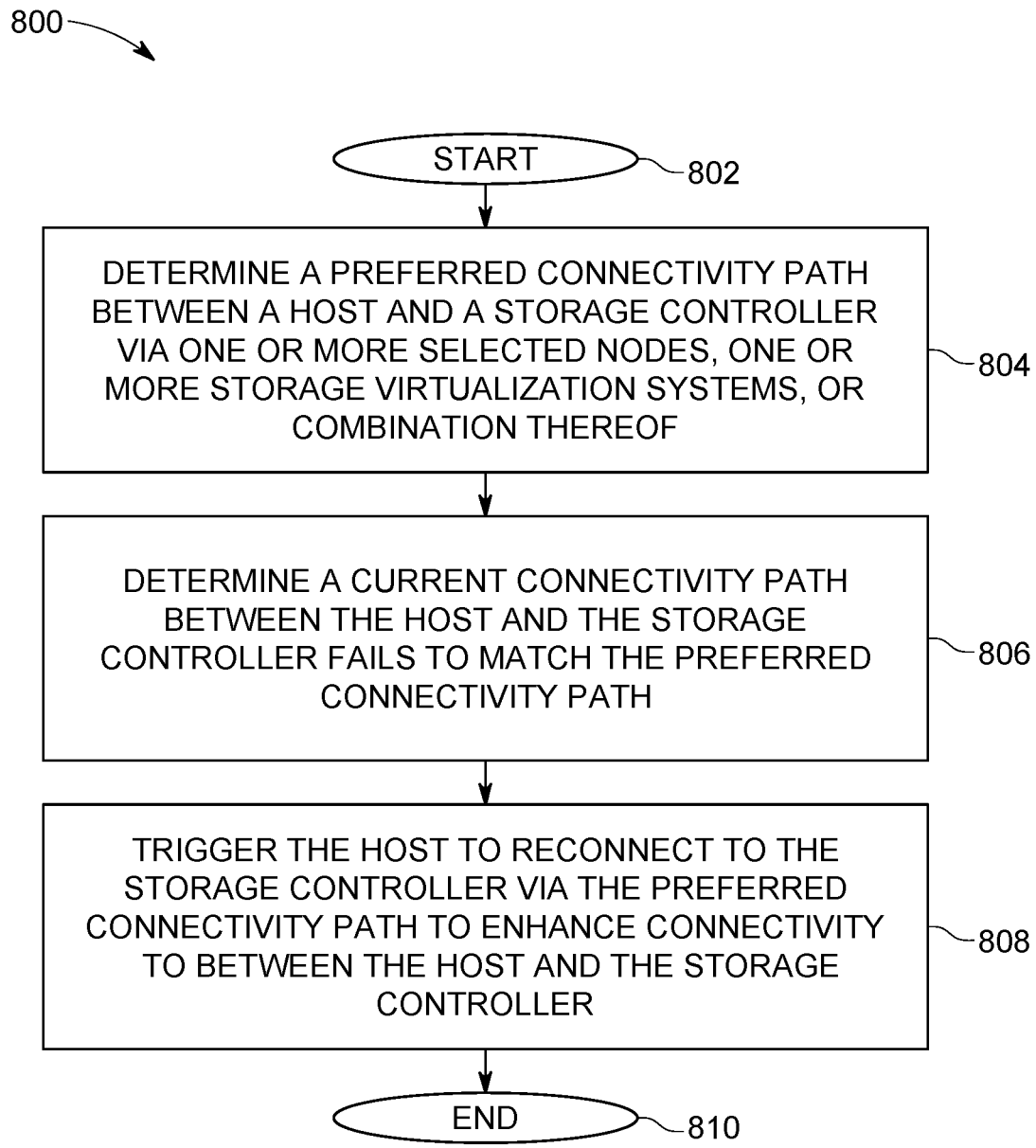
FIG. 8 is an additional flowchart diagram depicting an exemplary method for optimizing connectivity in a storage system by a processor; again, in which aspects of the present invention may be realized.

Turning now to FIG. 8, a method 800 for optimizing connectivity in a storage system by a processor is depicted, in which various aspects of the illustrated embodiments may be implemented. That is, FIG. 8 is a flowchart of an additional example method 800 for optimizing connectivity in a storage system in a computing environment according to an example of the present invention. The functionality 800 may be implemented as a method executed as instructions on a machine, where the instructions are included on at least one computer readable medium or one non-transitory machine-readable storage medium. The functionality 800 may start in block 802. A preferred connectivity path may be determined between a host and a storage controller via one or more selected nodes, one or more storage virtualization systems, or combination thereof, as in block 804. A current connectivity path between the host and the storage controller may be determined to fail to match the preferred connectivity path, as in block 806. The host may be triggered to reconnect to the storage controller via the preferred connectivity path to enhance connectivity to between the host and the storage controller, as in block 808. The functionality 800 may end in block 810.

In one aspect, in conjunction with and/or as part of at least one block of FIG. 8, the operation of 800 may include one or more of each of the following. The operation of 800 may determine whether a current connectivity path between the host and the storage controller is the preferred connectivity path. That is, operation 800 may determine the current connectivity path between the host and the storage controller is not the preferred connectivity path. The preferred connectivity path is an optimized connectivity path in the storage system.

The operation of 800 may store a mapping of the host to one or more logical unit numbers (LUN), and/or store a mapping of the host to the one or more storage virtualization systems.

The host may be signaled to indicate the current connectivity path fails to match the preferred connectivity path (e.g., the current connectivity path between the host and the storage controller is not the preferred connectivity path). That is, an asynchronous message may be sent to the host with a list of Internet protocol addresses (IPs) to login to for connecting to the preferred connectivity path. The operation of 800 may connect (e.g., login) to one or more Internet protocol addresses (IPs) on the preferred connectivity path and disconnect (e.g., logout) from one or more IPs not associated with the preferred connectivity path.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks that may be shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for optimizing connectivity in a storage system by a processor, comprising:
    storing a mapping of connectivity between a host and one or more logical unit numbers (LUNs) exposed by a storage controller in the storage system;
    upon receiving one or more Input/Output (I/O) operations by the storage controller from the host to access one of the LUNs, determining, by the storage controller, whether a current connectivity path between the host and the storage controller is a preferred connectivity path to the accessed LUN; wherein the determination as to whether the current connectivity path is the preferred connectivity path is performed, at least in part, by identifying a cache miss during the one or more I/O operations including detecting a number of one or more selected nodes the one or more I/O operations pass through resulting from the cache miss; and wherein the preferred connectivity path between the host and the storage controller is determined by examining the mapping of connectivity from the host to the accessed LUN via the one or more selected nodes and one or more storage virtualization systems; and
    responsive to determining the current connectivity path is not the preferred connectivity path, triggering the host to reconnect to the storage controller via the preferred connectivity path to enhance connectivity to between the host and the storage controller, wherein the triggering further includes sending an asynchronous message from the storage controller to the host with a list of Internet protocol addresses (IPs) to login to for connecting to the preferred connectivity path.

2. The method of claim 1, further including storing a mapping of the host to the one or more storage virtualization systems.

3. The method of claim 1, further including signaling the host to indicate that the current connectivity path fails to match the preferred connectivity path.

4. The method of claim 1, further including connecting to one or more of the IPs on the preferred connectivity path and disconnecting from one or more IPs not associated with the preferred connectivity path.

5. A system for optimizing connectivity in a storage system in a computing environment, comprising:
    one or more computers with executable instructions that when executed cause the system to:
        store a mapping of connectivity between a host and one or more logical unit numbers (LUNs) exposed by a storage controller in the storage system;
        upon receiving one or more Input/Output (I/O) operations by the storage controller from the host to access one of the LUNs, determine, by the storage controller, whether a current connectivity path between the host and the storage controller is a preferred connectivity path to the accessed LUN; wherein the determination as to whether the current connectivity path is the preferred connectivity path is performed, at least in part, by identifying a cache miss during the one or more I/O operations including detecting a number of one or more selected nodes the one or more I/O operations pass through resulting from the cache miss; and wherein the preferred connectivity path between the host and the storage controller is determined by examining the mapping of connectivity from the host to the accessed LUN via the one or more selected nodes and one or more storage virtualization systems; and
        responsive to determining the current connectivity path is not the preferred connectivity path, trigger the host to reconnect to the storage controller via the preferred connectivity path to enhance connectivity to between the host and the storage controller, wherein the triggering further includes sending an asynchronous message from the storage controller to the host with a list of Internet protocol addresses (IPs) to login to for connecting to the preferred connectivity path.

6. The system of claim 5, wherein the executable instructions when executed cause the system to store a mapping of the host to the one or more storage virtualization systems.

7. The system of claim 5, wherein the executable instructions when executed cause the system to signal the host to indicate that the current connectivity path fails to match the preferred connectivity path.

8. The system of claim 5, wherein the executable instructions when executed cause the system to connect to one or more of the IPs on the preferred connectivity path and disconnect from one or more IPs not associated with the preferred connectivity path.

9. A computer program product for, by a processor, optimizing connectivity in a storage system, the computer program product comprising a non-transitory computer-readable storage medium having computer-readable program code portions stored therein, the computer-readable program code portions comprising:

an executable portion that stores a mapping of connectivity between a host and one or more logical unit numbers (LUNs) exposed by a storage controller in the storage system;

an executable portion that, upon receiving one or more Input/Output (I/O) operations by the storage controller from the host to access one of the LUNs, determines, by the storage controller, whether a current connectivity path between the host and the storage controller is a preferred connectivity path to the accessed LUN; wherein the determination as to whether the current connectivity path is the preferred connectivity path is performed, at least in part, by identifying a cache miss during the one or more I/O operations including detecting a number of one or more selected nodes the one or more I/O operations pass through resulting from the cache miss; and wherein the preferred connectivity path between the host and the storage controller is determined by examining the mapping of connectivity from the host to the accessed LUN via the one or more selected nodes and one or more storage virtualization systems; and an executable portion that, responsive to determining the current connectivity path is not the preferred connectivity path, triggers the host to reconnect to the storage controller via the preferred connectivity path to enhance connectivity to between the host and the storage controller, wherein the triggering further includes sending an asynchronous message from the storage controller to the host with a list of Internet protocol addresses (IPs) to login to for connecting to the preferred connectivity path.

10. The computer program product of claim 9, further including an executable portion that stores a mapping of the host to the one or more storage virtualization systems.

11. The computer program product of claim 9, further including an executable portion that signals the host to indicate that the current connectivity path fails to match the preferred connectivity path.

12. The computer program product of claim 9, further including an executable portion that connects to one or more of the IPs on the preferred connectivity path and disconnects from one or more IPs not associated with the preferred connectivity path.

* * * * *